United States Patent [19]

McBurney et al.

[11] Patent Number: 5,402,347

[45] Date of Patent: Mar. 28, 1995

[54] SATELLITE SEARCH METHODS FOR IMPROVING TIME TO FIRST FIX IN A GPS RECEIVER

[75] Inventors: Paul W. McBurney, Santa Clara; Lynn Weber, Saratoga, both of Calif.

[73] Assignee: Trimble Navigation Limited, Sunnyvale, Calif.

[21] Appl. No.: 95,953

[22] Filed: Jul. 22, 1993

[51] Int. Cl.⁶ .............................. G01S 5/04; H04B 7/08
[52] U.S. Cl. ................................. 364/443; 364/449; 342/357
[58] Field of Search .................... 364/443, 449, 447; 342/417, 418, 357, 385, 386

[56] References Cited

U.S. PATENT DOCUMENTS

| | | | |
|---|---|---|---|
| 4,578,678 | 3/1986 | Hurd | 342/357 |
| 4,785,463 | 11/1988 | Janc et al. | 342/386 |
| 4,972,431 | 11/1990 | Keegan | 342/357 |
| 4,983,980 | 1/1991 | Ando | 342/357 |
| 5,101,416 | 3/1992 | Fenton et al. | 342/357 |
| 5,117,232 | 5/1992 | Cantwell | 342/357 |
| 5,148,452 | 9/1992 | Kennedy et al. | 364/728.03 |
| 5,155,491 | 10/1992 | Ando | 364/449 |
| 5,175,557 | 12/1992 | King et al. | 342/357 |
| 5,192,957 | 3/1992 | Kennedy | 342/357 |

Primary Examiner—Kevin J. Teska
Assistant Examiner—Tyrone V. Walker
Attorney, Agent, or Firm—Thomas E. Schatzel

[57] ABSTRACT

An embodiment of the present invention includes a GPS receiver capable of concurrently tracking up to eight GPS satellites. The GPS receiver comprises computer-implemented methods for parallel search, split search and precomputation. The parallel search method causes the apparent Doppler frequency spectrum to be sectioned into several segments and a first GPS satellite signal is searched for in parallel in each of the segments. When the first GPS fix is not found after a predetermined time has expired, a split search is begun.

5 Claims, 4 Drawing Sheets

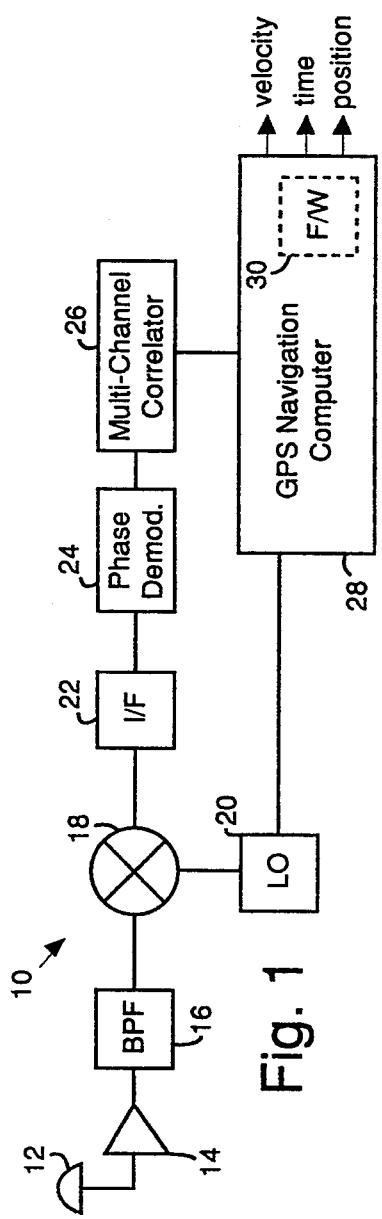
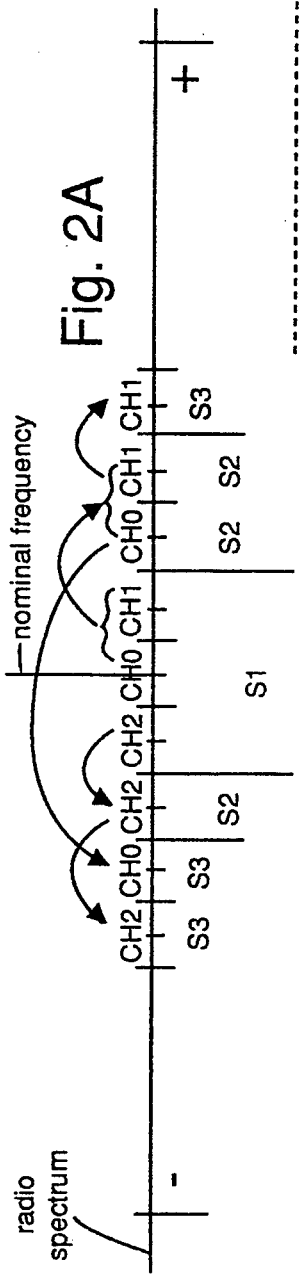
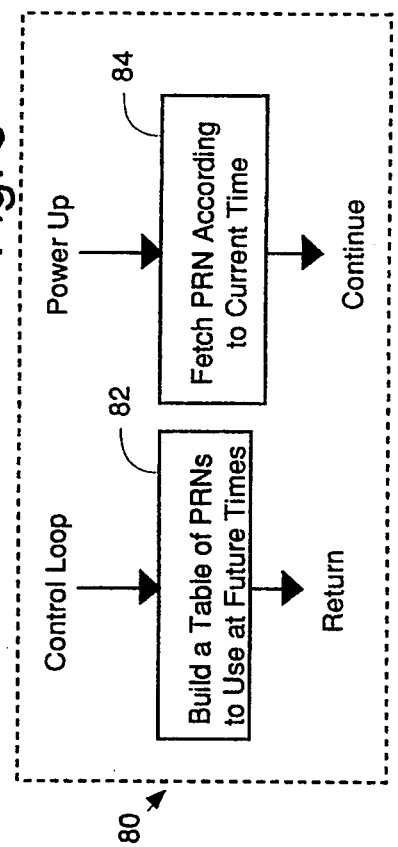
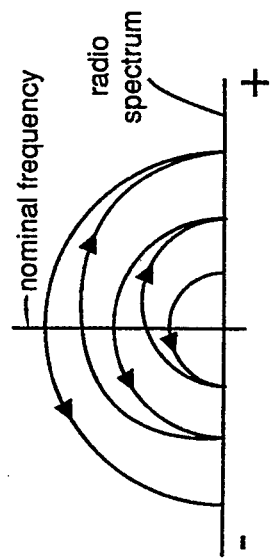

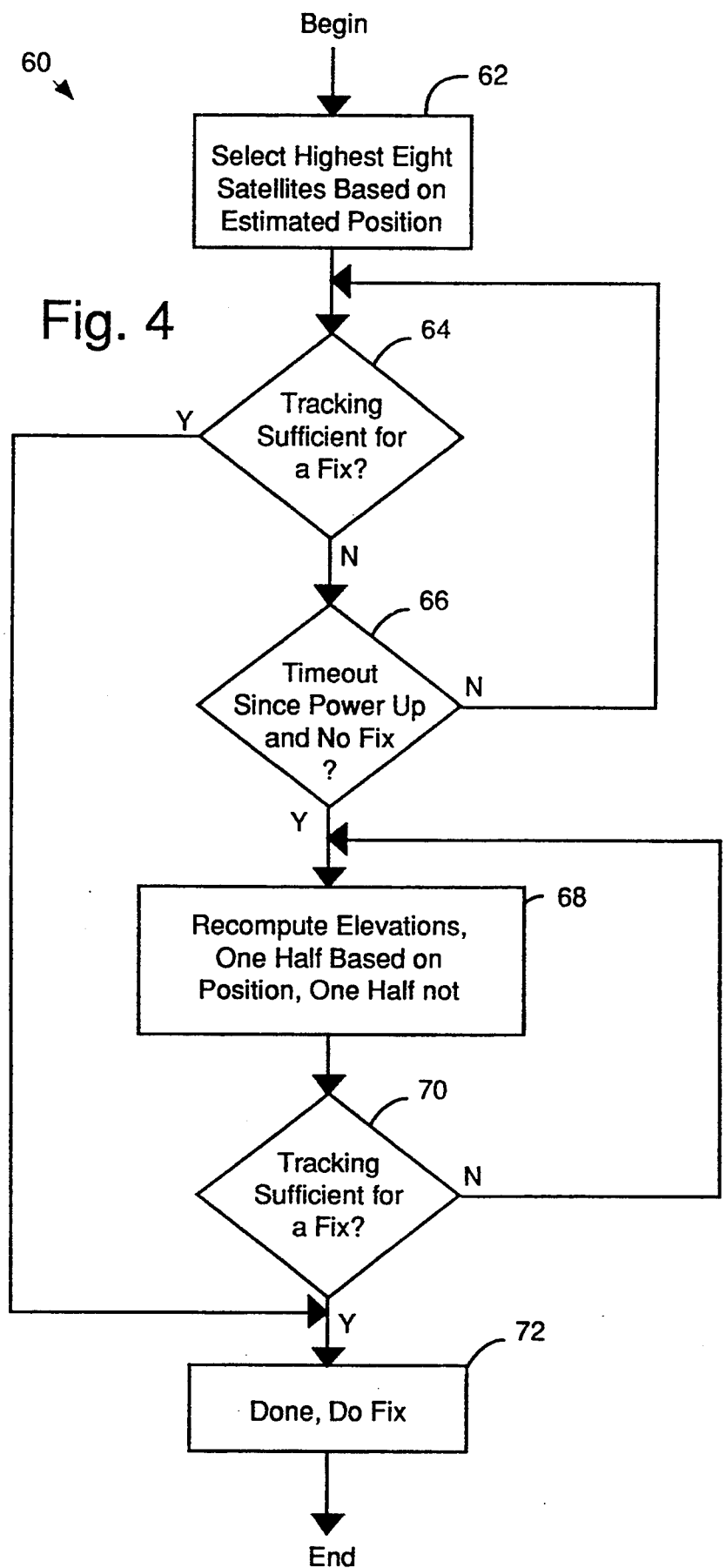

SATELLITE SEARCH METHODS FOR IMPROVING TIME TO FIRST FIX IN A GPS RECEIVER

BACKGROUND OF THE INVENTION

1. Field of the Invention

The invention relates generally to navigation systems and more specifically to global positioning system (GPS) devices with rapid time-to-first-fix and re-acquisition performance.

2. Description of the Prior Art

Global positioning system receivers use signals received from typically three or more overhead satellites to determine navigational data such as position and velocity, and such systems may also provide altitude and time. GPS signals are available worldwide at no cost and can be used to determine the location of a vehicle, such as an automobile, to within one city block, or better. Dual-frequency carrier GPS receivers typically track a pair of radio carriers, L1 and L2, associated with the GPS satellites to generate accumulated delta-range measurements (ADR) from P-code modulation on those carrier frequencies and at the same time track L1 C/A-code to generate code phase measurements. Carrier frequency L1 is allocated to 1575.42 MHz and carrier frequency L2 is positioned at 1227.78 MHz. Less expensive receivers tune only one carrier frequency, and therefore do not have adequate information to compute the local ionospheric delays that will appear as position errors. At such frequencies, radio carrier signals travel by line-of-sight.

Thus buildings, mountains and the horizon can block reception.

The constellation of GPS satellites in orbit about the earth presently comprises approximately seventeen individual satellites. Each transmits one of thirty-two unique identifying codes in a code multiple access arrangement. This allows all of the many GPS satellites to transmit in spread spectrum mode at the same frequency (plus or minus a Doppler frequency shift of that frequency as results from the satellite's relative velocity). Particular satellites are sorted out of a resulting jumble of signals and noise by correlating a 1023 "chip" code to one of the thirty-two pseudo random number (PRN) sequence codes that are preassigned to individual GPS satellites. These codes are not necessarily being transmitted in phase with one another. Therefore, "finding" a GPS satellite initially involves searching various carrier frequencies, to account for Doppler frequency shift and oscillator inaccuracies, and searching for a code match, using 1023 different code phases and twenty or more possible correlation code templates.

In large cities with many tall buildings, one or more of the GPS satellites being tracked by a particular receiver, may be temporarily blocked. In some situations, such blockage can prevent all the overhead GPS satellites from being tracked and such outages can last for several minutes. GPS signals also become unavailable to vehicles moving through underground or underwater tunnels.

At least one background art GPS five-channel receiver directs all of its channels to focus on one satellite at initial turn-on, as is indicated by the user display on such receivers. This addresses the problem of satellite signal frequency uncertainty that exists due to Doppler effects and local oscillator inaccuracies in the receiver. A search for a particular satellite in the apparent Doppler frequency spectrum is conducted in parallel by segmenting the possible Doppler frequency spectrum into as many segments as there are receiver channels and appointing each of the several receiver channels to attend to a search within a respective segment. The single largest uncertainty stems from the random frequency possible from typical local oscillators at start-up. Therefore, the apparent Doppler frequency will be totally unknown, regardless of whether the actual Doppler frequency is known, as might be available if the present position is known.

SUMMARY OF THE PRESENT INVENTION

It is therefore an object of the present invention to provide a system and method for reducing the time necessary for a first fix after turning on a GPS receiver.

Briefly, a preferred embodiment of the present invention includes a GPS receiver capable of concurrently tracking up to eight GPS satellites. Firmware included in the GPS receiver comprises computer-implemented methods for parallel search, split search and precomputation. The parallel search method causes the apparent Doppler frequency spectrum to be sectioned into several segments and a first GPS satellite signal is searched for in parallel in each of the segments. If the first GPS satellite is not found after a predetermined time has expired, then other satellites are attempted until a first satellite is tracked.

Information from the parallel search is used to speed up acquisition of subsequent satellites. If enough satellites are not acquired for obtaining a first position fix, after a predetermined duration, then a split search is conducted. The search method allows a lower cost local oscillator to be employed that lacks the temperature stability of prior art oscillators. The split search method causes as many as half of the available channels to be appointed to search for a first set of GPS satellites while a second set of GPS satellites is sought in a search with the remaining channels. The precomputation method determines which GPS satellites are expected to be at the highest elevations over the next succeeding several hours and prepares a search list of those candidate GPS satellites for use when the GPS is next turned-on. If the time between turning-off and turning the GPS receiver back on is only a few hours, the precomputed candidate search list is indexed to supply a GPS satellite's identity that should result in a quick find after a relative short search.

An advantage of the present invention is that it provides a method for improving the time-to-first-fix for a GPS receiver.

Another advantage of the present invention is that a system is provided that reduces search delays encountered when a GPS receiver has been denied signal reception for several minutes at the time the GPS receiver is first turned-on.

A further advantage of the present invention is that a system is provided that searches two lists of possible GPS satellite signal sources, one list related to the last determined position and the second list interleaved with the first that uses the remaining positions in the world for its position assumptions.

Another advantage of the present invention is that a system is provided that precomputes future tracking opportunities and therefore saves time in searching for GPS satellites to track when restarted after a short period of non-operation.

A further advantage of the present invention is that a system is provided that includes a parallel search that puts the most search power around a nominal frequency and then moves the search outward after quickly searching the interior range.

Another advantage of the present invention is that a system is provided that includes a split search to minimize time-to-first-fix when the receiver antenna is covered or blocked at power up, while still allowing the receiver to be moved great distances while powered off by not entirely trusting in the last position.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a block diagram of a GPS receiver embodiment of the present invention that includes a set of computer-implemented methods in firmware;

FIG. 2A is a diagram of the radio spectrum and the apparent Doppler frequency spectrum divided into search ranges;

FIG. 2B is a diagram of the radio spectrum and the apparent Doppler frequency spectrum showing a ping-pong sequence within a typical search range of FIG. 2A;

FIG. 4 is a flowchart of the split search method included as a computer subroutine in the firmware of the GPS receiver of FIG. 1; and FIG. 5 is a flowchart of the precomputation of future tracking opportunities method included as a computer subroutine in the firmware of the GPS receiver of FIG. 1.

DETAILED DESCRIPTION OF THE PREFERRED EMBODIMENT

Figure 3A:
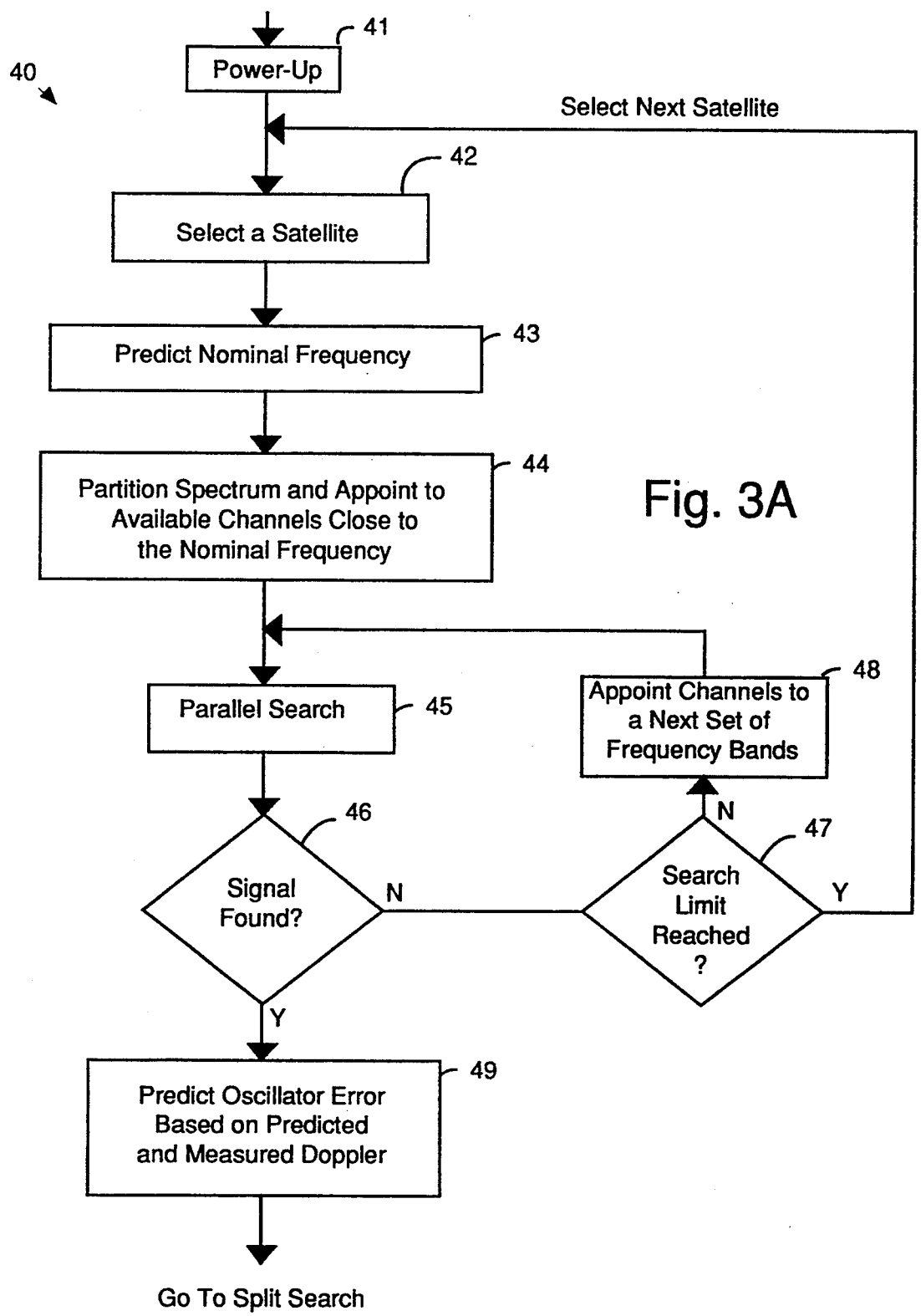
FIG. 3A is a flowchart of the parallel search method included as a computer subroutine in the firmware of the GPS receiver of FIG. 1.

FIG. 1 illustrates a global position system (GPS) receiver embodiment of the present invention, referred to herein by the general reference numeral 10. GPS receiver 10 is a six-channel type and includes a patch antenna 12, a low-noise amplifier 14, bandpass filter (BPF) 16, a mixer 18, a local oscillator (LO) 20, an intermediate frequency (IF) stage 22, a phase demodulator 24, a multi-channel GPS code correlator 26 and a GPS navigation computer 28 with a firmware memory 30. Except for some parts of firmware 30, GPS receiver 10 may comprise a commercially available unit, such as a portable three-channel GPS receiver marketed by Trimble Navigation (Sunnyvale, Calif.), under the trademark "ENSIGN".

Firmware 30 comprises computer instructions (programs) necessary for the determination of geographic position and velocity of GPS receiver 10, together with the time. Such programs are conventional and include functions to vary the frequency output of LO 20 to sweep through the apparent Doppler frequency spectrum to find signals captured by antenna 12 from GPS satellites. Correlator 26 is fed a variety of pseudo-random number (PRN) correlation codes and phases to demodulate information carried by spread spectrum communication. GPS navigation computer 28 calculates the pseudo-ranges to a number of visible GPS satellites and uses orbit ephemeris and satellite almanac periodically received from the GPS satellites to determine a position fix by triangulation with the predetermined positions of the GPS satellites.

When GPS receiver 10 is first powered up, only a guess can be made as to which GPS satellites will be in the vicinity, based on the last position and the almanac. A search through a list of possible PRN correlation codes must be conducted to identify and track those GPS satellites that are actually available. After enough GPS satellites are acquired for a fix, the GPS satellites to then search for can be accurately predicted, leaving no uncertainty about the respective horizon angle of each. At least three GPS satellites must typically be tracked for a position determination output from GPS navigation computer 28.

A Doppler frequency shift of the transmitted carrier frequency of each GPS satellite will occur that is dependent on the velocity (vector plus speed) relative to GPS receiver 10. This actual Doppler frequency shift will create a few kilohertz uncertainty about the assigned L1 carrier frequency that must be overcome by sweeping through the radio spectrum to find the desired signal. Almanac information can be used to predict what the Doppler frequency should be, and so the search can be constrained.

However, inaccuracies in the absolute frequency output of LO 20 can cause the spectrum of apparent Doppler frequencies to be broader than would otherwise be the case, e.g., plus or minus ten kilohertz. The prior art obtains quicker searches through the apparent Doppler frequency spectrum by using very high quality temperature-compensated crystal oscillators (TCXO). Such high quality local oscillators are expensive and add significant cost to GPS receiver 10. These oscillators have stabilities on the order of one to two parts per million (ppm). Low cost oscillators can vary as much as twenty ppm. Therefore, a compromise is traditionally made between the expense of the local oscillator and the time-to-first-fix required to search through the apparent Doppler frequency spectrum.

GPS receiver 10 has only to sweep within approximately three hundred hertz of a GPS satellite signal to establish a lock on its carrier frequency. Such frequency sweeping is implemented by causing navigation computer 28 to load a variety of divider values for numerically controlled oscillators (NCO) that are a part of LO 20. Phase lock loop (PLL) circuitry, conventional to such devices within LO 20, provides the ability to capture and lock within a limited range. Therefore, when searching for a signal from a GPS satellite, a strategy, as illustrated in FIGS. 2A and 2B is used.

In FIG. 2A, a three-channel GPS receiver is directed to align its three channels (CH0, CH1 and CH2) shoulder-to-shoulder in a first set (S1) of bins centered on a nominal center frequency. FIG. 2B shows a "ping-pong" search strategy that is used within each bin to locate the GPS satellite's signal. Initially, the search begins close in on one side (+ is shown) to the nominal center frequency of the respective bin, and bounces close in to the opposite side (− in the example). The bounce back and forth takes the search within each bin wider and wider until the whole bin has been searched. In FIG. 2A, once the search of the three bins of S1 have been completed, a second set (S2) of bins is tried next. In FIG. 2A, CH0 and CH1 are appointed to the next two higher bins above S1, and CH2 is appointed to the next bin below S1. The selection of which channels to use and which side gets the odd remainder channel is arbitrary. To balance the odd channel being used above the nominal frequency in S2, a set three (S3) has two bins below and one bin above the nominal center frequency. Many conventional search strategies for finding a signal within a pair of range boundaries exist, and many are compatible with the macro search strategy embodiment of the present invention described herein. The present invention is therefore not limited to the high and low ping-pong search just described.

Figure 3B:
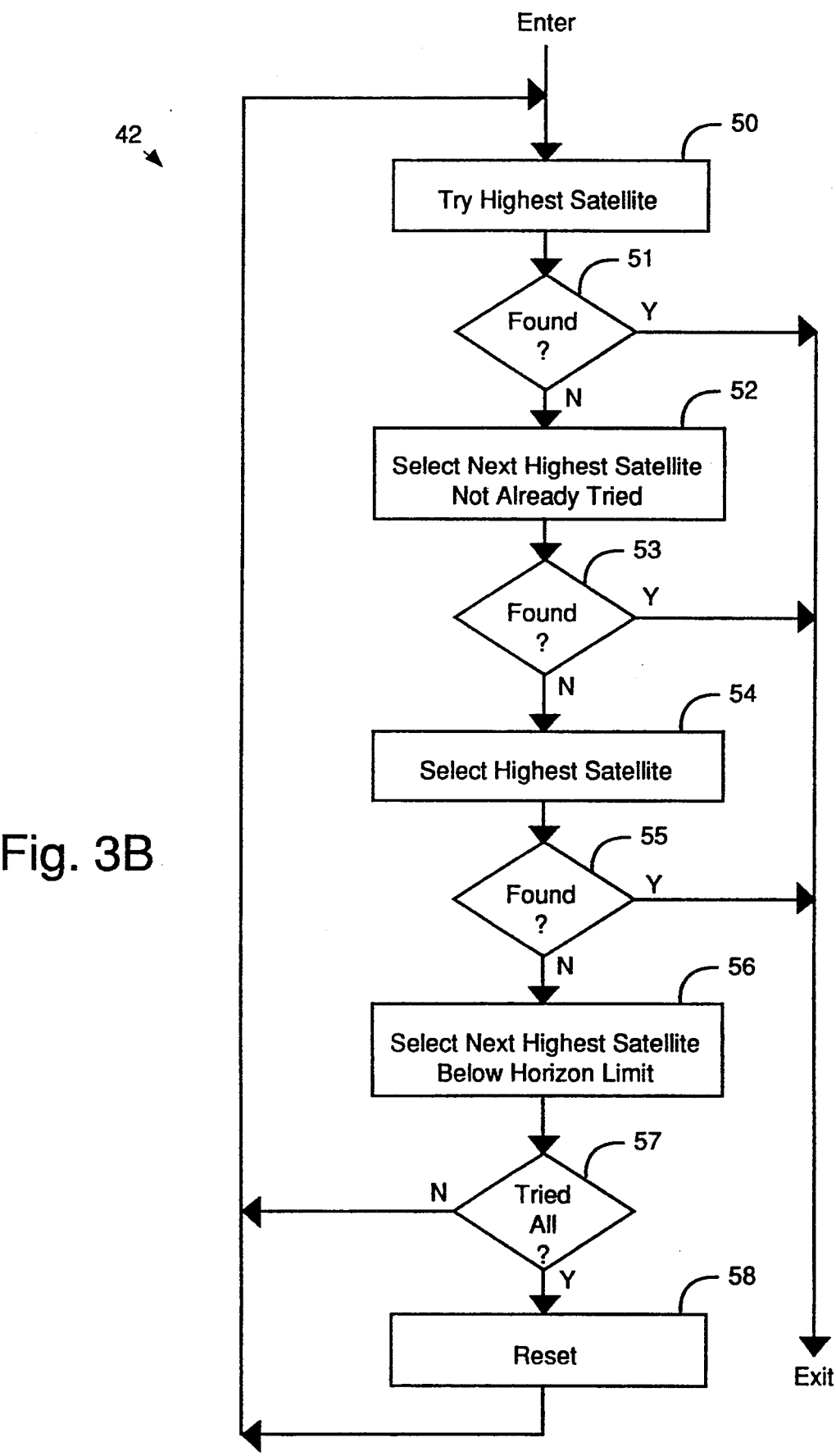
FIG. 3B is a flowchart of a satellite selection process included in that of FIG. 3A.

A parallel search computer-implemented process 40, illustrated by the flowcharts of FIGS. 3A and 3B, causes GPS navigation computer 28 to segment the apparent Doppler frequency spectrum into several sections (e.g., first through third search ranges in FIG. 2A) and conducts parallel searches within each section using the multiple GPS receiver channels available. In the case of a portable three-channel GPS receiver being used for GPS receiver 10, a part of the apparent Doppler frequency spectrum is divided into a lower, a nominal and an upper frequency segment. Enough time is allowed for parallel searches within each frequency segment to search plus or minus one kilohertz. If a GPS satellite signal is not found, the upper and lower channels are stepped out further so that each may search another segment of plus or minus one kilohertz.

Process 40 comprises a power up step 41, a step 42 that selects a satellite to search for, a step 43 predicts a nominal center frequency for the selected satellite, a step 44 partitions the radio frequency spectrum and appoints the available GPS receiver channels such that they cluster about the nominal center frequency. A step 45 causes each of the GPS receiver channels to search a first set of respective frequency bands in parallel (S1 in FIG. 2A). However, the apparent Doppler frequency spectrum that may need to be searched may be wider than S1. A decision is made in a step 46 whether a signal has been found. If not, a step 47 decides whether a search limit has been exceeded. For example, the search limit could be a limit of time and/or of frequency. If the search limit has been exceeded, then control passes back to step 42 to select another satellite. Otherwise, a step 48 appoints the available channels to a next set of frequency bands. A step 49 estimates the oscillator error based on both predicted and measured Doppler frequency. Then a split search is conducted. All subsequent searches before the first fix use this estimate to refine, bound, or minimize the search range for other satellites. For example, if the actual Doppler frequency for a satellite is one kilohertz (KHz) and the oscillator error is ten kilohertz, each satellite would take the limit to search, e.g., ten KHz. Thus the ten KHz range is only searched once, quickly.

In FIG. 3B, step 42 is shown to comprise a step 50 in which the highest GPS satellite is tried. If a signal from that GPS satellite was found, a step 51 directs the program control to exit. Otherwise, a step 52 selects the next highest GPS satellite not already tried. If a signal from that GPS satellite was found, a step 53 directs the program control to exit. Otherwise, a step 54 again tries the highest GPS satellite. If a signal from that GPS satellite was found, a step 55 directs the program control to exit. Otherwise, a step 56 selects the next highest GPS satellite which appears to be below the horizon limit. A step 57 looks to see if all the available GPS satellites have been tried. If not, control returns to step 50. Otherwise, a step 58 does a reset. For example, if there are six GPS satellites SV1 through SV6 with respective elevation angles of 70°, 40°, 10°, −5°, −15° and −90°, then the order of selecting just described will select SV1, SV2, SV1, SV5, SV1, SV3, SV1, SV4, SV1 and SV6. After a reset as a result of step 58, the order will again be, SV1, SV2, SV1, SV5, SV1, SV3, SV1, SV4, SV1 and SV6. It will eventually try all the satellites, regardless of elevation.

In the present invention, if the Doppler frequency error is close in, as is usually the case, it may be found faster than can be done with the prior art. This results from placing more search capability near the predicted frequency, which is often very close to the actual frequency. For example, if the actual frequency is at −4 KHz and nominal at −1 KHz, the present invention can find the signal in the first pass. It would take a maximum search time to find the signal for a non-precomputed or a non-centered alternate technique.

With greater numbers of GPS receiver channels available in GPS receiver 10, more search ranges can be searched in parallel at any one time. With an even number of channels, e.g., six channels, the search ranges are preferably positioned in frequency such that the nominal frequency is near the center of one of the two middle search ranges, rather than along a border between them. Although this makes the search range a little lopsided around the nominal frequency, the probability of finding a GPS satellite signal is a bit better at the nominal frequency and a search will conclude sooner because searches typically start at the center of each search range, not the edges. FIG. 2A is typical of the sequence of such searches from S1 through S3 and beyond.

If antenna 12 (FIG. 1) is covered when GPS receiver 10 is first turned on, navigation computer 28 would typically discard any assumptions or precomputed information it may have had about which GPS satellites are probably in the vicinity. After a search had failed to track such GPS satellites, other GPS satellites would be tried. In the prior art, the original set of GPS satellites would not be retried until all the others in orbit about the world had been tried first. The round-robin time of such a search can be exceedingly long, and can cause a user to assume GPS receiver 10 is inadequate or not functional. Prior art GPS receivers avoided such problems by requiring the user to initialize the unit by asking for the current position. This is unpopular with users, because a GPS receiver is supposed to provide one with a position, not ask for it. Therefore, such queries have been eliminated, but the uncertainty still remains.

A split search computer-implemented process 60 is diagrammed in FIG. 4. In a step 62, the eight GPS satellites with the highest elevation based on an estimate of position are selected. It may be the case, however, that the assumed horizon may be wrong. In a step 64, a decision is made whether a sufficient number of GPS satellites are being tracked to obtain a current position fix. If not, a step 66 tests to see if, since power up, a time-out has been exceeded and there are still an insufficient number of GPS satellites to compute a fix. For example, if five minutes has elapsed, a step 68 is engaged. Otherwise, control returns to step 64 to allow more time. Step 68 re-computes elevations of GPS satellites every thirty seconds and bases a search using one half of the GPS satellites based on position and the others regardless of position. For example, GPS satellites below the apparent horizon will be tried in a search for their signals.

As mentioned in reference to FIGS. 2A and 2B, initially, only one set of search ranges or bins is computed, based on the last position, time and almanac, until a five minute time-out occurs. Then the "split" aspect is begun. A first search list preferably includes the highest elevation satellites that have been predicted by navigation computer 28 using the GPS almanac and the last position fix to be the most likely to be available for tracking. A second list may include those satellites that have been predicted by navigation computer 28 by sequentially searching for satellites independent of position, thus their elevation angles may be negative based on the present position could be erroneous. This strategy is based on the assumption that if GPS receiver 10 has been moved since the last operational period, the travel is more probably to have been a shorter trip rather than a longer trip, and therefore the horizon of the previous fix is more likely than the opposite side of the world, for example.

It can require as much as three seconds after powering-on GPS receiver 10 to allow navigation computer 28 to compute which PRNs to use, based on current time, a current almanac and a previous position fix stored in memory. A precomputation process 80, illustrated in FIG. 5, can be run periodically after the receiver has begun computing positions. Process 80 builds a table, in a step 82, of the particular PRNs that should be used for various times in the near future. Therefore, if GPS receiver 10 is powered down and then powered back up a few hours later, GPS navigation computer can index and use the list of PRNs previously computed, in a step 84, and thus save time to a first fix. Ephemeris information obtained during previous periods of operation will be fresh enough and useful for only five or six hours after collection. Almanac information typically will have a useful life of approximately four weeks. However, if the period of non-operation exceeds several hours, the new ephemeris data collected must be processed and the advantage of precomputation will be proportionately diminished. Therefore, precomputation process 80 includes the on-going background routine 82 that builds a table of which PRNs should be used for various times in the near future and indexes each by time. The initialization subroutine 84, executed at power-up of GPS receiver 10, fetches the PRNs from the table according to the current time.

Once a first GPS satellite signal has been found, the apparent Doppler frequency can be further constrained in searches for additional satellites, thus speeding up the search for those additional satellites and the time it will take to compute a first position fix. This occurs when the oscillator uncertainty is much greater than the Doppler frequency caused by the relative motion between the satellite and the receiver.

In the present invention, if the first searched satellite is not found after lapse of a period of time sufficient to search the entire Doppler frequency spectrum, then a first assumption that such first satellite should have been visible given a probable position, is discarded. Then a second assumption is made that causes the next lowest elevation satellite to be sought. (Satellites with higher elevations tend to have the strongest signals and a minimum of Doppler frequency shift.) If the second assumption fails, the first assumption is retried, followed again by the second assumption and then a third assumption that causes the still next lowest elevation satellite to be sought. Each assumption will typically dwell for twenty seconds.

Every fourth time, a satellite below the horizon is tried, in case the receiver has moved a large distance. The assumptions about which satellites are visible can become invalid when a GPS receiver has been shipped a great distance since the last time it was turned-on and allowed to acquire a signal. However, such assumptions cannot be discarded too quickly or too permanently because temporary problems can take a while to clear and the initial assumptions could well be correct. For example, a GPS receiver in a car parked in a tall parking garage could be denied GPS signal availability after turn-on for several minutes while the car makes it way out through the structure.

The present invention further provides for a precomputation of which GPS satellites will be visible at various times in the near future. This allows a GPS receiver to be turned-off and then turned back on up to several hours later and to use the identity of the GPS satellite most likely to be at the highest elevation, and thus the most visible, in an initial search.

After acquiring the first satellite, a split search is conducted if a position fix is not found after lapse of a period of time sufficient to search the entire Doppler frequency spectrum, based on the current position. Given "n" number of available receiver channels, half of those channels will be used to continue a first assumption that such first satellite should have been visible, given a probable position. The other half of the available channels is used for a second assumption that causes a next lowest elevation satellite to be sought. If the second assumption fails, a third assumption that causes the still next lowest elevation satellite to be sought is tried in the second half of the available channels.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for quickly obtaining a first positional fix after a short period of non-operation with a multiple channel GPS receiver having a local oscillator with a frequency uncertainty that exceeds an actual Doppler carrier frequency shift and adds to the total apparent Doppler frequency shift, the method comprising the steps of:

pre-computing a table of codes associated with a plurality of constellations of orbiting GPS satellites predicted to be visible at a plurality of times in the future based on a current time and a GPS satellite almanac and a predetermined geographic position of said GPS receiver with said table indexed according to said future times;

fetching one part of said table of codes according to a time said GPS receiver is re-powered up after a period of power-off that followed the step of pre-computing said table;

searching for a signal from a first GPS satellite associated with said fetched part of said table of codes in parallel using said multiple channels of said GPS receiver such that a first frequency search range is positioned with a nominal frequency estimated for said GPS satellite signal at its mid-point and a first GPS receiver channel is appointed to search said first frequency search range and a second GPS receiver channel is appointed to search in parallel a second frequency search range adjacent to said first frequency search range;

splitting said multiple channels between searching for said first GPS satellite and a second GPS satellite if said first GPS satellite signal was not found; and using an offset frequency value for controlling said local oscillator obtained from locking onto a first-found GPS satellite signal in subsequent searches for other GPS satellite signals, wherein said local oscillator frequency uncertainty contribution to said total apparent Doppler frequency shift is substantially reduced in magnitude, and the time required to acquire a subsequent satellite signal is thus substantially reduced.

2. The method of claim 1, wherein:

the pre-computing of said table includes ephemeris information obtained previous to said period of power-off and said table extends forward in time for period limited by the validity of said ephemeris information.

3. A method for quickly obtaining a first positional fix after a short period of non-operation with a multiple channel GPS receiver having a local oscillator with a frequency uncertainty that exceeds an actual Doppler carrier frequency shift and adds to the total apparent Doppler frequency shift, the method comprising the steps of:

pre-computing a table of pseudo random number (PRN) codes associated with GPS satellites predicted to be visible at a plurality of times in the future based on a current time and GPS satellite almanac and a predetermined geographic position;

fetching a PRN code from said table according to a time said GPS receiver is re-powered up after a period of non-operation that followed the step of pre-computing said table; and using an offset frequency value for controlling said local oscillator obtained from locking onto a first-found GPS satellite signal in subsequent searches for other GPS satellite signals, wherein said local oscillator frequency uncertainty contribution to said total apparent Doppler frequency shift is substantially reduced in magnitude, and the time required to acquire a subsequent satellite signal is thus substantially reduced.

4. A method for searching in parallel for acquisition of a signal from a GPS satellite with a multiple channel GPS receiver having a local. oscillator with a frequency uncertainty that exceeds an actual Doppler carrier frequency shift and adds to the total apparent Doppler frequency shift, the method comprising the steps of:

pre-selecting a particular carrier frequency as a nominal frequency within an apparent Doppler frequency spectrum for GPS satellite signals that includes a relatively larger frequency uncertainty contributed by inaccuracies in said local oscillator;

partitioning said apparent Doppler frequency spectrum into a plurality of adjacent frequency search ranges such that a particular first frequency search range near the center of said apparent Doppler frequency spectrum includes said nominal frequency; appointing a first of said GPS receiver channels to search said first frequency search range;

appointing a second of said GPS receiver channels to search a second frequency search range above and adjacent to said first frequency search range;

appointing any but said first of said GPS receiver channels to search a third frequency search range below and adjacent to said first frequency search range;

searching within said first and at least one of said adjacent frequency search ranges for said signal from a GPS satellite and terminating the search if said signal is found;

appointing any but said first of said GPS receiver channels to search a fourth frequency search range above and adjacent to said second frequency search range;

appointing any but said first of said GPS receiver channels to search a fifth frequency search range below and adjacent to said third frequency search range;

searching within said first and at least one of said adjacent frequency search ranges for said signal from a GPS satellite; and using an offset frequency value for controlling said local oscillator obtained from locking onto a first-found GPS satellite signal in subsequent searches for other GPS satellite signals, wherein said local oscillator frequency uncertainty contribution to said total apparent Doppler frequency shift is substantially reduced in magnitude, and the time required to acquire a subsequent satellite signal is thus substantially reduced.

5. A multiple channel GPS receiver, comprising:

GPS navigational computer means for pre-computing a table of pseudo random number (PRN) codes associated with GPS satellites predicted to be visible at a plurality of times in the future based on a current time and GPS satellite almanac and a predetermined geographic position;

table indexing means for fetching a PRN code from said table according to a time said GPS receiver is re-powered up after a period of non-operation that followed the step of pre-computing said table;

radio receiver means having a local oscillator with a frequency uncertainty that exceeds an actual Doppler carrier frequency shift Which adds to the total apparent Doppler frequency shift and for searching for a signal from a first GPS satellite associated with said fetched PRN code in parallel using said multiple channels of said GPS receiver such that a first frequency search range is positioned with a nominal frequency for said GPS satellite signal at its mid-point and a first channel is appointed to search said first frequency search range and a second channel is appointed to search in parallel a second frequency search range adjacent to said first frequency search range;

multi-channel GPS receiver means for splitting said multiple channels between searching for said first GPS satellite and a second GPS satellite if said first GPS satellite signal was not found; and local oscillator offset-control means for finding an offset frequency value to controlling said local oscillator, determined from locking onto a first-found GPS satellite signal, in subsequent searches for other GPS satellite signals, wherein said local oscillator frequency uncertainty contribution to said total apparent Doppler frequency shift is substantially reduced in magnitude, and the time required to acquire a subsequent satellite signal is thus substantially reduced.

* * * * *